Sept. 13, 1955          J. D. RUST          2,717,481

COTTON LIFTER FOR COTTON HARVESTING MACHINE

Filed June 30, 1952          2 Sheets-Sheet 1

John D. Rust,
Inventor,

Bruninga and Sutherland,
Atty's.

Sept. 13, 1955  J. D. RUST  2,717,481
COTTON LIFTER FOR COTTON HARVESTING MACHINE
Filed June 30, 1952  2 Sheets-Sheet 2

John D. Rust,
Inventor,
Bruninga and Sutherland,
Attys.

United States Patent Office 2,717,481
Patented Sept. 13, 1955

2,717,481

COTTON LIFTER FOR COTTON HARVESTING MACHINE

John D. Rust, Pine Bluff, Ark.; Thelma F. Rust and J. C. Reeves, coexecutors of the estate of John D. Rust, deceased Application June 30, 1952, Serial No. 296,270

5 Claims. (Cl. 56—28)

This invention relates to cotton harvesting machines, and more particularly, to the plant entrance part for gathering and directing cotton into the harvesting mechanism of the machine.

In spindle-type cotton harvesting machines, it is not mechanically practicable to have the bottom row of picking spindles much closer than about four inches from the bottom of the picking unit. This means that in operation the picking spindles cannot be operated much nearer to the ground than approximately four inches. Heretofore, it has been proposed to use limb lifters in the form of rearwardly inclined rods, the front ends of which ride upon or near to ground level and lift the lower portions of the plants up to the level of the lower spindles. Such limb lifters are more or less satisfactory in fields where the cotton stalks are tall or of medium height, but fields are encountered where the plant stalks are extremely small and the bolls are concentrated close to the ground, or where cotton has fallen from the plants and lies loosely on the ground.

From experience, I have found that a lifter having a narrow slot, open at both ends and set at the proper angle, can be made to raise the lowest bolls up to the path of picking spindles. Two problems, however, are encountered in the use of this simple slot arrangement. Where the crop is heavy near the ground, the plain slot type of lifter will bunch the lifted cotton so as to overload the lower spindles, the result being a considerable loss due to cotton being dropped. It is accordingly one of the objects of this invention to provide for distribution of the lifted cotton bolls over a wide vertical range of spindles.

Furthermore, in order to pick extremely low cotton, it is necessary to run the forward ends of the lifters in contact with the ground. In the event there are rocks, brickbats, chunks, or extremely hard clods in the field, some of this debris is swept up with the cotton by the lifters and is delivered to the picking tunnel or plant passageway where it may bend or break the spindles. It may be noted that it has heretofore been the practice to extend the walls of the plant entrance down to the level of the lifting rods. Indeed, the lifting rods were mounted on these walls or fenders at their lower edges, and the fenders were movable vertically. Consequently, if the apparatus were adjusted to gather low-flying cotton, debris was also guided back into the plant passageway. In contrast, it is an object of this invention to provide for gathering of the lowest cotton, yet also exclude ground debris of spindle-damaging size from the plant passageway.

To the attainment of these objectives, briefly, I provide a cotton lifting unit arranged to ride on or next to the ground for gathering and delivering low-lying cotton up to the picking mechanism. This unit comprises a pair of forwardly extending, rearwardly inclined lifting rails spaced apart an amount sufficient to pass the plant stalks while preventing cotton from falling between the rails. At the front of these lifting rails, there is provided a debris trap formed to permit cotton bolls to pass therethrough while catching any debris of a size and character that would damage the spindles of the picking mechanism. On the outer sides of the debris trap there are provided limb-lifting fenders with curved front surfaces adjacent the trap for guiding the lower limbs of the plants over the debris trap. The lifting unit further includes a pair of ground feelers movably mounted to project from the front of the lifting rails in forwardly-divergent floating relationship, so as to follow the contours of the ground. In one form, these feelers are rod-like fingers which reach below low-lying limbs to direct the limbs onto the limb-lifting fenders. In another form, these feelers are ground rakes which sweep onto the lifting rails low-lying cotton, including any cotton that has fallen to the ground.

The arrangement of the ground feelers and limb-lifting fenders is such as to cause much of the debris to be discharged over the sides of the unit, especially with use of the finger-type feelers; and any debris tending to enter between the limb-lifting walls of the unit, as may occur with the rake-type feelers, is caught in the debris trap, if such debris is of size large enough to damage the spindles.

The invention further comprises the provision of a conveyor arranged above the lifting rails to direct cotton rearwardly and urge it upwardly for more even distribution over the spindles. This conveyor is shown to be an auger arranged with its axis extending parallel to and above the lifting unit per se. Cooperating with the auger is a vertical side wall arranged so that the upper portions of the plants are held in the auger and carried rearwardly. Spaced deflectors may be mounted forwardly of the auger and the cooperating side wall substantially above ground level.

Other features of the invention will be in part apparent from and in part pointed out in the following detail description taken in connection with the accompanying drawings, in which.

Figure 1:
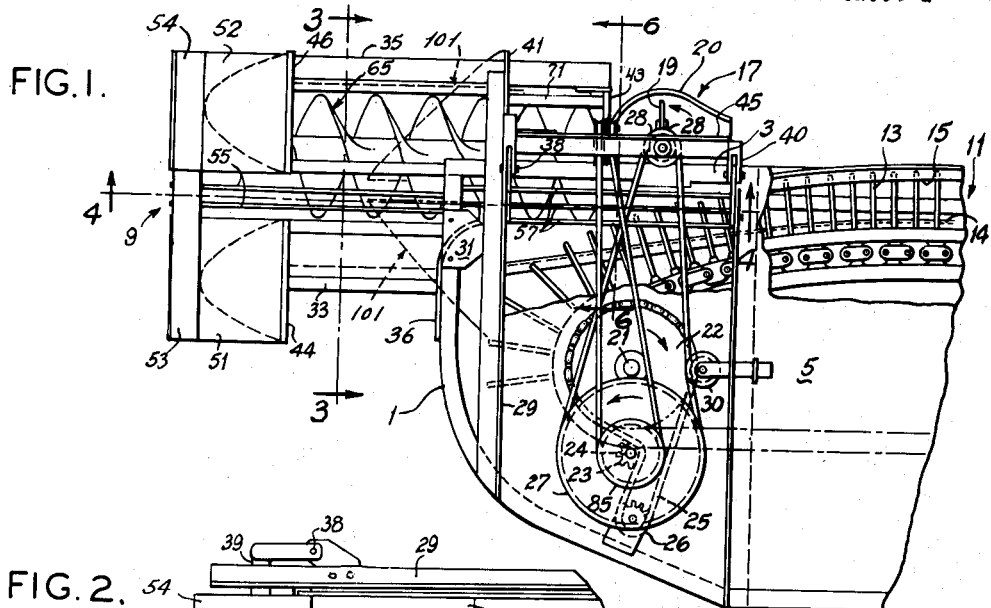
Fig. 1 is a top plan view with parts broken away of a part of a cotton picking unit showing the entrance assembly of this invention.

Referring to the drawings, there is shown a front part of a picking unit of a cotton picking machine including frame elements 1 and 3, a top cover 5 and a side cover 7. It will be understood, a cotton picking machine generally comprises a wheeled vehicle from which one or more picking units is suspended for cooperation with the cotton plants. The vehicle is guided along a row of plants in such fashion as to cause the plant to enter an entrance 9 of the plant passageway partially shown at 11. As the plants pass through the passageway, cotton is gathered by rotating spindles 13 which move along the passageway with the plants. The details of the passageway and spindle system are not shown as they are known in the art, but briefly, one type of unit includes a belt formed with a plurality of vertically disposed spindle slats carried upon upper and lower endless chains. One side of the plant passageway is formed by vertically superposed horizontal stalk guards 14 and the other side is formed by a suitable stalk crowder wall 15. The chains carrying the slats are trained around front and rear sprockets (beneath the top 5) so that the spindles carried by the slats project between the stalk guards into and across the plant passageway. The shaft for the forward sprockets is shown at 21.

Immediately ahead of the stalk crowder 15, there may be a cotton fluffing device 17 which is more particularly described in my co-pending United States patent application Serial No. 273,584, filed February 27, 1952, now Patent 2,657,515. This fluffing device generally includes flexible flaps or blades 19 which are driven in a counterclockwise direction from the forward shaft 21 within a housing 20. A large sprocket 22 on the shaft 21 drives a smaller sprocket 23 on a second shaft 24 by means of a chain 25, which is also trained about an idler 26. The fluffer is belt driven from the shaft 24 by a large pulley 27, there being a smaller pulley 28 on the fluffer and a belt idler 30.

The assembly also includes guide means located ahead of the fluffing device for gathering and directing cotton-bearing portions of the plants into the plant passageway, and it is in this entrance assembly that the invention differs from prior cotton-picking machines. The entrance assembly may be formed as an integral part of a complete cotton-picking machine or cotton-picking unit, or it may be provided as an attachment for such machines to be employed when the conditions of the field are such that conventional guides are comparatively ineffective.

A transverse angle rail 29 extends across the frame elements 1 and 3 at the front of the picking unit and is secured by a bracket 31. The rail 29 forms a part of a framework, which includes lateral supporting bars 33 and 35 extending forwardly on opposite sides of the assembly. A shield member 37 is mounted ahead of the spindles 13, and the bar 33 projects forwardly from a plate 36 attached to this shield 37. The other side of the assembly is supported from the frame on front and rear hinges 38 and 40. A vertically disposed angle member 39 extends downward from the end of the angle member 29 adjacent the hinge 38 and carries a bracket 41 at its lower end. The lateral supporting bar 35 extends forwardly and rearwardly through this bracket 41 and is secured at its rear end to a generally vertical member 43 (see Fig. 6), which member 43 may be fastened to the fluffer housing 20. An upper longitudinal brace 45 extends over the fluffer between the hinges 38 and 40, and the fluffer is supported at its top from this brace 45.

The bars 33 and 35 are cantilevered forwardly to support a pair of deflectors 47 and 49, respectively, on transverse braces 44 and 46, respectively. These deflectors are vertically disposed V-shaped guides of sheet metal supported so that their lower edges are a substantial distance above ground level. The deflectors are covered at their tops by means of plates 51 and 52 and are connected by a transverse pipe 53. The plate 51 is fastened directly to this pipe whereas the plate 52 is fastened to a sleeve 54 which telescopes over the pipe. As shown, the deflectors are spaced to define the entrance to a relatively wide passage for the upper portions of plants, and top guide rods 55 are secured to the pipe 53 to extend rearwardly toward the frame element 1. These guide rods cooperate with a set of additional guide rods 57 fastened to the frame element 1, which rods 57 continue rearwardly toward the plant passageway 11. The guide rods 55 and 57 are spaced, relative to the size of cotton bolls, to force the tops of plants downwardly within the plant passageway.

Figure 3:
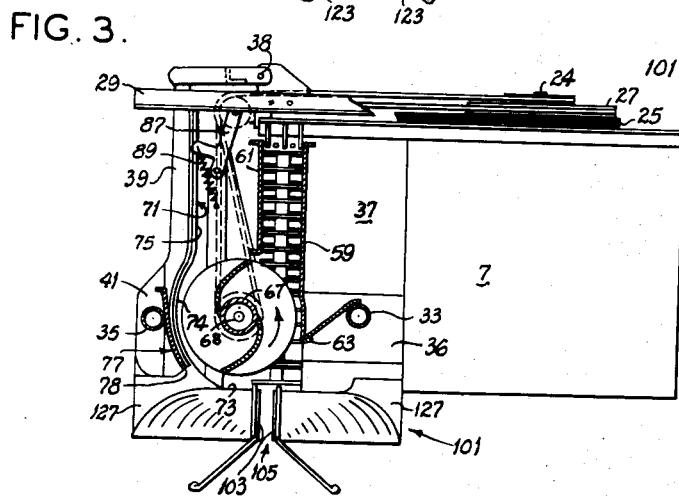
Fig. 3 is a transverse vertical section taken on the line 3—3 of Fig. 1.

As shown in Fig. 3, the plant passage defined by the forward deflectors and upper guide rods is also bounded by guiding side walls 59 and 61, in the form of sheet-metal partitions which extend rearwardly from the inner edges of the deflectors 47 and 49, respectively. These partitions 59 and 61 terminate, respectively, at the spindle shield 37 and the cotton fluffer housing 20. The lower part of the passage is defined on one side by the bottom 63 of the side wall 59, which edge is spaced well above ground level, and on the other side by a large auger or screw conveyor, generally designated 65.

Figure 4:
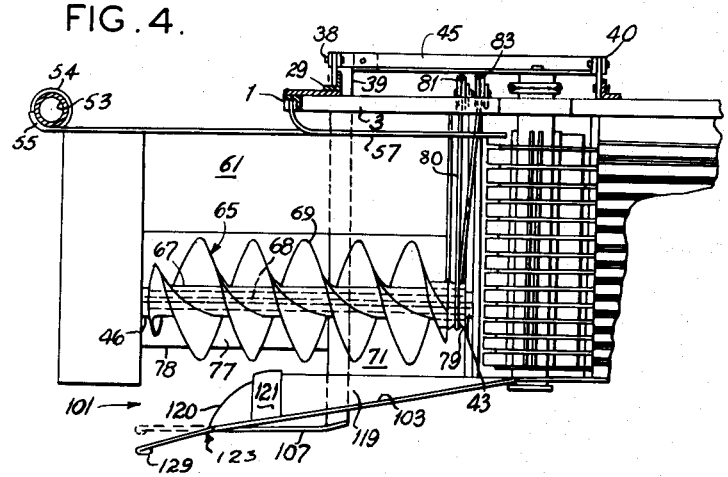
Fig. 4 is a longitudinal vertical section taken on the line 4—4 of Fig. 1, a moved position of parts being shown by dotted lines.

The auger is arranged lengthwise with its sleeve 67 journaled on a rod 68, which rod has its ends fixed in the transverse brace 46 and in the frame member 43. The flights or blades 69 of the conveyor project substantially across the plant passage to engage the plants and move them through the passage. As best shown in Figs. 3 and 4, the conveyor is covered on its outer side by curved shields. A sheet-metal cover 71 at the rear is curved from a bottom edge 73 below the auger around the outer part of the blade as at 74 and extended at 75 up to the top of the assembly. The cover 71 extends forwardly to the vertical frame member 39. A second sheet-metal cover 77 is located between the frame member 39 and the deflector 49, this cover having its lower edge 78 spaced above the edge 73 of the rear cover.

Figure 6:
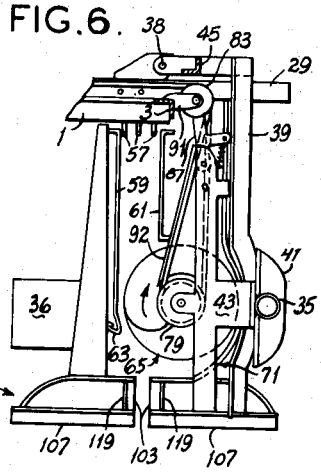
Fig. 6 is a vertical section taken generally on the line 6—6 of Fig. 1.

The screw conveyor 65 is driven from a pulley 85 on the shaft 24 of the picking unit. At its rear end, the conveyor has a sheave formed with a rounded groove 79 (Fig. 4) around which is trained a belt 80, the groove 79 being relatively larger than the belt 80 in order to permit slip therebetween in the event the auger becomes jammed. The belt is carried over a pair of sheaves 81 and 83 at the top of the assembly and driven from a sheave 85 secured over the fluffer drive sheave 27 on the shaft 24. The arrangement is such that the auger is driven in a counterclockwise direction as viewed from the front, and the blades are arranged to convey material rearwardly and upwardly. The particular mounting of sheaves 81 and 83 is not important, but a belt tightening action is preferably provided. For example, the sheave 81 may be mounted upon a lever 87 pivoted to the frame member 43 and spring biased outwardly by a spring 89. The other sheave 83 may be mounted upon a support 91 fixed to the frame element 3 (Fig. 6). A belt guard 92 may be located ahead of the belt to protect it from the plants.

The assembly also includes a cotton-lifting unit 101 supported from the framework below the plant passage described above. (Fig. 5 differs from Figs. 2–4 only in the form of certain ground feelers to be described.) This unit comprises a pair of rearwardly-inclined lifting rails or guide members 103 spaced apart to define a narrow, open-ended slot 105 forming the lower part of the entrance to the assembly. The slot 105 is shown in Fig. 3 to be located under the auger, and the slot is of a width sufficient to retain cotton upon the lifting rails while permitting the rails to pass by the stalks of the plants. This spacing may be of the order of one inch.

Mounted alongside these rails 103 are limb-lifting fenders 109, which have rearwardly-divergent front edges 111. These fenders are curved back as indicated at 113 to a floor surface 115 of the generally triangular outline so as to provide rearwardly convergent side edges 117. The upper portions of the fenders are then connected with the lifting rails 103 by means of vertical guiding walls 119. The forward edges 120 of these walls 119 are also curved up and back to lift and guide the limbs over a debris trap located therebetween. Debris-trapping blocks 121 are mounted upon the walls and have vertical front edges or surfaces spaced apart to permit the passage of cotton therebetween, while selectively blocking and trapping debris of a size and character as might damage the spindles. Bottom members 107 of the lifting unit are attached to the frame of the picking unit on one side and to the vertical hinged member 39 on the other side.

It will be noted, the arrangement is such that the front part of the lifting unit 101 cantilevers forwardly below the auger and side wall 59 and is spaced therebelow in order to permit limbs of the plants to be guided over the fenders 109. The curved rear outer cover 71 for the auger has its lower edge 73 substantially in contact with the floor 115 on one side of the unit. Fillet-forming members 127 and 128 at the outer corners of the unit provide for a smooth transfer of the limbs around the supporting framework.

Referring to Fig. 4, the lifting rails 103 also function as supports for a pair of floating ground feelers 123 arranged at the front end of the slot 105 in forwardly-divergent relationship. The front ends 125 of the rails are canted outwardly and the feelers 123 are pivotally mounted, as by rods 126, in order to permit the feelers to ride upon and follow the contours of the ground. Normally, the ground feelers would be angled downwardly and forwardly upon opposite sides of the dirt mound along a row of plants, but they may swing upwardly, as indicated by the dotted lines of Fig. 4, to follow variations in ground contour.

Figure 2:
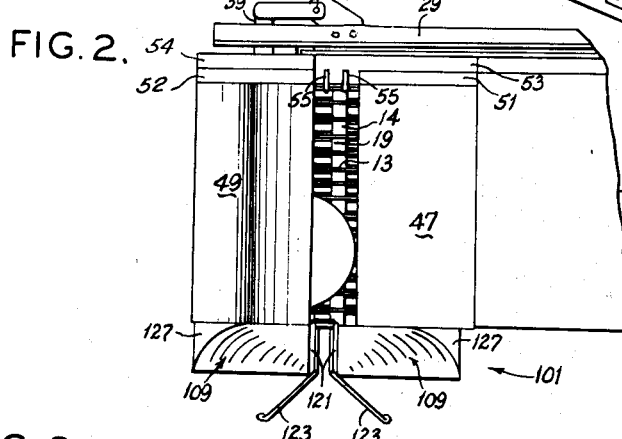
Fig. 2 is a front elevation of the unit shown in Fig. 1.
Figure 5:
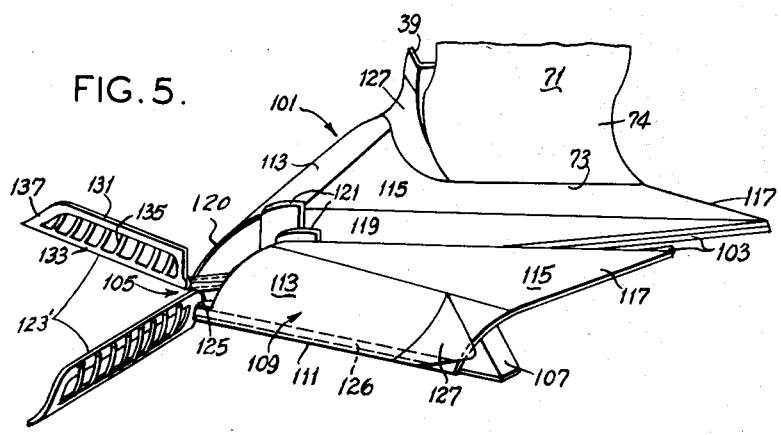
Fig. 5 is an enlarged perspective view of the cotton-lifting unit forming a part of the invention and showing an alternative form of the ground feelers.

The ground feelers are shown in Figs. 2–4 to be rod-like fingers 123 with their front ends 129 bent back to ride upon the ground and reach under low-lying limbs. The limbs are then directed onto the lifting unit and ground debris may ride over the rods 123. An alternative embodiment of the feelers is shown in Fig. 5. The apparatus of Fig. 5 is identical to that previously described, except as to the shape of the ground feelers; and Fig. 5 shows how ground feelers of either type may be pivotally mounted by means of rods 126. In this second form, the feelers are rake-like members 123' with upper and lower margins 131 and 133 connected by spaced bars 135, and with the front ends 137 somewhat pointed to slip under the limbs. The open construction serves to permit loose dirt to pass through the rakes without being scooped into the slot 105, but does function to sweep up cotton on the ground and guide it into the channel formed by the vertical walls 119 and the rails 103. It will be understood that with some types of plants, the cotton is concentrated near the ground on short limbs, or some of the cotton may be lying loosely on the ground, hence the rakes of Fig. 5 are adapted to sweep this cotton onto the rails 103 for lifting thereby and also by the auger 65.

In operation, the front ends of the rails 103 of the cotton-lifting unit 101 ride on or next to the ground along a row of cotton plants. The ground feelers 123 project outwardly and may project downwardly if the row is of mound shape. The deflectors 47 and 49 are carried substantially above the ground forwardly of the unit 101. It will be understood the picking unit may be mounted in any suitable manner, such, for example, as shown in Rust Patent No. 1,894,198, issued January 10, 1933.

As the machine travels along a row of cotton plants, the upper portions of the plants are directed inwardly by the deflectors 47 and 49 and are carried rearwardly with respect to the machine with the aid of the auger 65. At the same time, the ground feelers 123 reach below limbs lying close to the ground and direct them onto the lifting fenders 109. As the limbs pass thereover, they are flipped or lofted upright, such being facilitated by the auger, the blades of which rotate upwardly in the plant passage. The auger is driven with the rearward speed of conveyance relative to the machine being slightly greater than the forward speed of the machine relative to the ground.

The rod-like shape of the ground feelers shown in Figs. 2–4 is adapted to permit ground debris such as bricks to pass thereover and be directed outwardly by the fenders 109. In the event, however, that a large rock is swept up, as may occur, especially with use of the rake-type of ground feelers of Fig. 5, the rock will lodge in the trap 121 at the entrance to the narrow slot 105. The spacing of the debris-trapping blocks 121 is sufficient to pass the cotton yet operates as a separator to trap rocks of such size as may damage the spindles. Debris of smaller size may pass between the members 121 but the spindles are not thereby damaged. When a rock lodges in the trap, it will become quickly apparent to the operator who may be riding immediately above the entrance so that the machine may be stopped and the rock removed.

In view of the above, it will be seen the lifter of this invention functions to gather all of the cotton in a row, including unattached bolls or bolls attached to short low-lying limbs, and to direct such cotton into the picking mechanism, which is necessarily elevated above ground level. Moreover, the low-lying cotton is not merely concentrated at the lower part of the picking mechanism but is more widely distributed in an upward direction by the action of the cotton-lifting unit and the screw conveyor. This conveyor has a diameter of about nine inches and has a double spiral. The width of the upper plant passage (between 59 and 61) is of the order of three inches. An additional function of the conveyor is to hold the plants at their top parts as they enter the slot 105 so that they will be properly guided into the lifting unit, and not be pushed over and run down.

From the foregoing description, it is apparent that those skilled in the art will understand the structure, function and mode of operation of the invention herein disclosed, and appreciate the advantages thereof. Although several embodiments have been disclosed in detail, it is to be understood that the invention is not limited thereto, but the drawings and description thereof are to be understood as being merely illustrative. It is realized that many modifications and variations will present themselves to those skilled in the art without departing from the spirit of this invention or the scope thereof as set forth in the appended claims.

Having thus described the invention, what is claimed and desired to be secured by Letters Patent is:

1. A cotton-lifting unit for attachment to a cotton-picking unit of the type having an open-front plant passageway; the lifting unit comprising a pair of supports adapted to be mounted on opposite sides of said plant passageway, a pair of elongate lifting members mounted one on each support with portions thereof projecting forwardly of their supports, said lifting members being spaced to define a narrow slot of uniform width and being disposed to extend from the plant passageway in forwardly-declining relationship so that the forward ends thereof ride closely adjacent the ground, and a pair of ground feelers mounted one on each lifting member at the forward ends thereof, said ground feelers being disposed to ride upon the ground in forwardly-divergent relationship and being pivotally mounted for vertical swinging movement, thereby to follow the contours of the ground.

2. A cotton-lifting unit as set forth in claim 1, wherein said ground feelers are thin rod-like members adapted to sweep beneath loose debris while crowding the plant stalks inwardly between said closely-spaced lifting members.

3. A cotton-lifting unit as set forth in claim 1, wherein said ground feelers are formed as rakes of substantial height, thereby to gather and sweep loose-lying cotton inwardly to the forward portions of said lifting members.

4. A cotton-lifting unit for attachment to a cotton-picking unit of the type having a plurality of picking spindles defining an open-front plant passageway; the lifting unit comprising a pair of supports adapted to be mounted on opposite sides of said plant passageway, a pair of elongate lifting rails mounted one on each support to project forwardly and downwardly from the bottom of the plant passageway as defined by the bottom row of picking spindles, said lifting rails being uniformly spaced apart on the order of one inch to pass the stalks of the cotton plants and having upper surfaces upon which the relatively wide balls of cotton may ride upwardly to the plant passageway, a pair of ground-raking members mounted one on each lifting rail at the forward ends thereof, said ground rakes being of substantial height and disposed in forwardly divergent relationship, thereby to gather and sweep loose-lying cotton inwardly to the forward portions of said lifting rails, and a pair of debris-trapping members mounted one on each support over said lifting rails, said debris-trapping members having front edges spaced apart an amount sufficient to pass soft balls of cotton while blocking passage of relatively hard ground debris of spindle-damaging size.

5. A lifting unit as set forth in claim 4, further comprising a pair of lifting fenders mounted one on each support to extend over said debris-trapping members, said fenders tapering upwardly and outwardly to guide low-lying limbs over said debris-trapping members, thereby to prevent such limbs from being caught on the debris-trapping members and torn from the plants.

References Cited in the file of this patent

UNITED STATES PATENTS

| | | |
|---|---|---|
| 1,003,836 | White | Sept. 19, 1911 |
| 1,007,504 | Tanner | Oct. 31, 1911 |
| 1,105,235 | Appleby | July 28, 1914 |
| 1,894,198 | Rust et al. | Jan. 10, 1933 |
| 1,926,338 | Johnston | Sept. 12, 1933 |
| 1,967,924 | Court | July 24, 1934 |
| 2,520,927 | Hagen | Sept. 5, 1950 |
| 2,641,888 | Grether | June 16, 1953 |
| 2,652,676 | Rust | Sept. 22, 1953 |